US012276403B2

(12) United States Patent
Tian

(10) Patent No.: US 12,276,403 B2
(45) Date of Patent: Apr. 15, 2025

(54) HOUSING FOR A LIGHTING DEVICE, AND A LIGHTING DEVICE HAVING THE HOUSING

(71) Applicant: SIGNIFY HOLDING B.V., Eindhoven (NL)

(72) Inventor: Liang Tian, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/572,961

(22) PCT Filed: Jun. 13, 2022

(86) PCT No.: PCT/EP2022/065972
§ 371 (c)(1),
(2) Date: Dec. 21, 2023

(87) PCT Pub. No.: WO2023/274698
PCT Pub. Date: Jan. 5, 2023

(65) Prior Publication Data

US 2024/0360984 A1 Oct. 31, 2024

(30) Foreign Application Priority Data

Jun. 29, 2021 (WO) ................ PCT/CN2021/103325
Sep. 7, 2021 (EP) .................................... 21195272

(51) Int. Cl.
*F21V 15/015* (2006.01)
*F21V 17/02* (2006.01)
(Continued)

(52) U.S. Cl.
CPC ............ *F21V 15/015* (2013.01); *F21V 17/02* (2013.01); *F21V 17/164* (2013.01); *F21V 31/00* (2013.01);
(Continued)

(58) Field of Classification Search
CPC .................................................. F21Y 2115/10
See application file for complete search history.

(56) References Cited

U.S. PATENT DOCUMENTS

2010/0304079 A1* 12/2010 Yang ......................... F21K 9/27 428/99
2011/0235320 A1 9/2011 Cai et al.
(Continued)

FOREIGN PATENT DOCUMENTS

CN 203068187 U * 7/2013
CN 103968353 A * 8/2014
(Continued)

OTHER PUBLICATIONS

English translation of Zhang CN-103968353-A (Year: 2014).*
English translation of Huang CN-203068187-U (Year: 2013).*

*Primary Examiner* — Evan P Dzierzynski

(57) ABSTRACT

A housing of a lighting device comprises a main body and an end cap, with an intermediate connecting member for connecting the end cap to the main body. The connecting member has first tabs for engaging the main body and second tabs for engaging the end cap. The end cap has a first, assembled, position and a second, disassembly, position, in which the end cap is pushed closer to the main body along an elongate direction of the main body. In the second position, the second tabs are deformed and released from their respective tab receiving channels so that the end cap can be slid off after a rotation to avoid the second tabs re-engaging.

13 Claims, 7 Drawing Sheets

(51) Int. Cl.

| | |
|---|---|
| ***F21V 17/16*** | (2006.01) |
| ***F21V 31/00*** | (2006.01) |
| *F21Y 103/00* | (2016.01) |
| *F21Y 115/10* | (2016.01) |

(52) U.S. Cl.
CPC ....... *F21Y 2103/00* (2013.01); *F21Y 2115/10* (2016.08)

(56) References Cited

U.S. PATENT DOCUMENTS

| | | | | |
|---|---|---|---|---|
| 2012/0099322 | A1* | 4/2012 | Simon | F21K 9/272<br>362/249.02 |
| 2013/0170196 | A1* | 7/2013 | Huang | F21V 29/506<br>362/221 |
| 2019/0032863 | A1* | 1/2019 | Wen | F21V 23/005 |

FOREIGN PATENT DOCUMENTS

| | | | |
|---|---|---|---|
| CN | 103868028 | B | 6/2016 |
| CN | 205299143 | U | 6/2016 |
| EP | 2194315 | A1 | 6/2010 |
| JP | 2010129228 | A | 6/2010 |
| JP | 2013008532 | A | 1/2013 |

* cited by examiner

HOUSING FOR A LIGHTING DEVICE, AND A LIGHTING DEVICE HAVING THE HOUSING

CROSS-REFERENCE TO PRIOR APPLICATIONS

This application is the U.S. National Phase application under 35 U.S.C. § 371 of International Application No. PCT/EP2022/065972, filed on Jun. 13, 2022, which claims the benefit of European Patent Application No. 21195272.6, filed on Sep. 7, 2021, and International Application No. PCT/CN2021/103325, filed on Jun. 29, 2021. These applications are hereby incorporated by reference herein.

FIELD OF THE INVENTION

The invention relates to lighting devices in which lighting components are mounted inside a housing with at least one end cap which closes the housing, for example to create waterproof enclosure. The lighting device may be a lamp or a luminaire.

BACKGROUND OF THE INVENTION

More and more LED luminaires need to be formed within a waterproof enclosure. The most common way is to use glue to seal the gap between different parts of the outer housing.

However, parts sealed and connected using glue are generally permanently fixed so cannot be disassembled, and parts within the sealed outer housing cannot easily be removed for replacement or recycling. Typically, to gain access to the inside of the waterproof housing, special tools are needed and some parts are destroyed.

For example, if at the end of a production line a LED device is not functional after the complete assembly process, there is a need to check the LED and LED driver PCB for faults. This checking process typically involves destroying the sealed parts with special tools and with large required forces. This action is typically not safe and none of the luminaire components can be reused since many parts are destroyed during disassembly.

There is therefore a need for a housing of a lighting device which can be waterproof and which can also be disassembled for inspection without destroying the whole lighting device, for example for testing or to enable more cost-efficient recycling.

SUMMARY OF THE INVENTION

The invention is defined by the claims.

According to examples in accordance with an aspect of the invention, there is provided a housing of a lighting device comprising:

- a tubular main body;
- an end cap for fitting to an end of the main body, the end cap comprising a ring portion for surrounding the tubular main body and an end face; and
- a connecting member for connecting the end cap to the main body,
- wherein the main body comprises a set of tab receiving portions,
- wherein the end cap comprises a set of tab receiving channels at an internal face of the ring portion, and
- wherein the connecting member comprises a periphery having:
- a first set of one or more projecting first tabs, each projecting towards the main body and each having an attachment portion for fitting to a respective tab receiving portion of the main body; and
- a second set of projecting second tabs each projecting towards the end cap and each having an attachment portion for fitting into a respective tab receiving channel of the end cap,
- wherein the tab receiving portions and the tab receiving channels are discrete units, wherein a width of each unit in a circumferential direction corresponds to a width in the circumferential direction of the corresponding attachment portion, and
- wherein the end cap has a first, assembled, position, in which the second tabs are fitted into their respective tab receiving channels, and a second, disassembly, position, in which the end cap is positioned closer to the main body along an elongate direction of the main body, and the second tabs are deformed and released from their respective tab receiving channels.

The attachment portions for example comprise hooks or barbs and they are for example at the distal end (forming a head) of the respective tab. The tabs project in a direction parallel to an elongate direction of the tubular main body. The hooks or barbs engage with the respective tab receiving portions or channels.

The three parts of the housing clip together. When the connecting member is fitted to the main body, the first tabs are retained in tab receiving portions (e.g. openings in the outer wall of the main housing). The connecting member is thus first clipped to the main housing, so that a structure is formed with projecting second tabs. These second tabs are then caught in channels of the end cap when the end cap is fitted over the sub-assembly of the main body and the connecting member. This holds the cap in place. However, the second tabs may be released from the channels by pushing the end cap even further over the main body. Thus, the housing can be disassembled to enable the contents of the main body (i.e. a lighting circuit) to be removed. This enables easy replacement of parts, or dismantling for recycling. The removable function of the end cap enables disassembly without special tools and enables many parts to be reused, saving cost and effort.

The tab receiving channels have a width in a circumferential direction which corresponds to (i.e. is the same or slightly larger than) a width in the circumferential direction of attachment portions of second tabs. In this way, after a rotation of the end cap relative to the tubular main body, the second tabs will no longer align with the tab receiving channels. As a result, the end cap can then be slid freely off the main tubular body.

The housing may be a luminaire housing or it may be the housing of a lamp, such as a tubular LED ("TLED") lamp.

The end cap for example comprises a set of stops aligned with the tab receiving channels along the direction parallel to the elongate direction of the tubular main body, so that when the end cap is pushed towards the main body, the stops abut the second tabs (i.e. the attachment portions of the second tabs) with the second tabs released from their respective tab receiving channels.

Thus, the end cap can be pushed further over the main body than the normal assembled end cap position and this releases the second tabs from the tab receiving channels. The end cap reaches an end position defined by the stops, with the second tabs released.

The end cap may be rotatable when in the second axial position to bring the second tabs (i.e. their attachment portions) out of alignment with their respective tab receiving channels. Thus, the end cap can be rotated by applying a torque so that when it is subsequently removed from the main housing, the second tabs (i.e. their attachment portions) no longer catch the tab receiving channels, and the end cap can be slid off the end of the main body.

The housing may comprise a set of alignment marks comprising a first mark on the end cap and a second mark on the main body, wherein the first and second marks are aligned when the second tabs are aligned with the tab receiving channels.

These marks thus guide a user to place the end cap with the correct angular orientation so that the second tabs are retained by the channels when the end cap is pushed over the main body, and the end cap is thereby clipped in place.

The set of alignment marks may further comprise a third mark on the main body, wherein the third and first marks are aligned when the second tabs are out of alignment with the tab receiving channels.

The third mark is thus used to guide a user to rotate the end cap to a suitable angular orientation (there may be many possible suitable angular orientations) so that the second tabs are free from the channels and the end cap can be taken off.

The connecting member may comprise a disc and the periphery is an outer region of the disc. This provides a strong rigid piece to fit over the end of the main body. The disc for example has a central opening to provide an access path between the end cap and the main body.

The first set for example comprises two or more first tabs. Two tabs are sufficient to provide a solid push fit coupling, and the connecting member can be glued to the main body with the taps in place.

The connecting member may further comprise wall portions between the first tabs. These wall portions and the first tabs for example together form a substantially complete annular wall. This can be used as the support for a glue connection between an outer surface of the connecting member and an inner surface of the main body. The first tabs however can deform radially away from this annular wall to snap into the tab receiving portions. The tabs have a length to provide sufficient deformation for this snap fit coupling.

The connecting member is for example glued to the main body with glue around an outer face of the periphery. If the tab receiving portions are openings through the wall of the main tubular body, glue may also be provided over those tab openings. Thus, the connecting member forms a sealed end to the main body.

The end cap is for example glued to the main body with glue between an overlap area between the ring portion of the end cap and the end of the main body. The glue connection between the end cap and the main body is for example adapted to be released when the end cap is pushed from the first position to the second position. Thus, the glue connection provides a sufficiently rigid coupling for normal use as well a seal, but it can be broken to allow disassembly. The glue is for example a silicone glue.

The overall housing is preferably waterproof. It may for example be used for both indoor and outdoor lamps or luminaires.

The connecting member is for example attachable to the main housing by a push fit, the end cap is attachable to main housing to the first position by a push fit, and the end cap is movable from the first position to the second position by a push operation with no tools. Thus, the assembly and disassembly may be performed by hand.

The invention also provides a lighting device comprising:

the housing as define above;

a second end cap at an opposite end of the main body to the end cap; and a lighting circuit disposed within the main body.

The lighting device is for example a tubular LED lamp.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
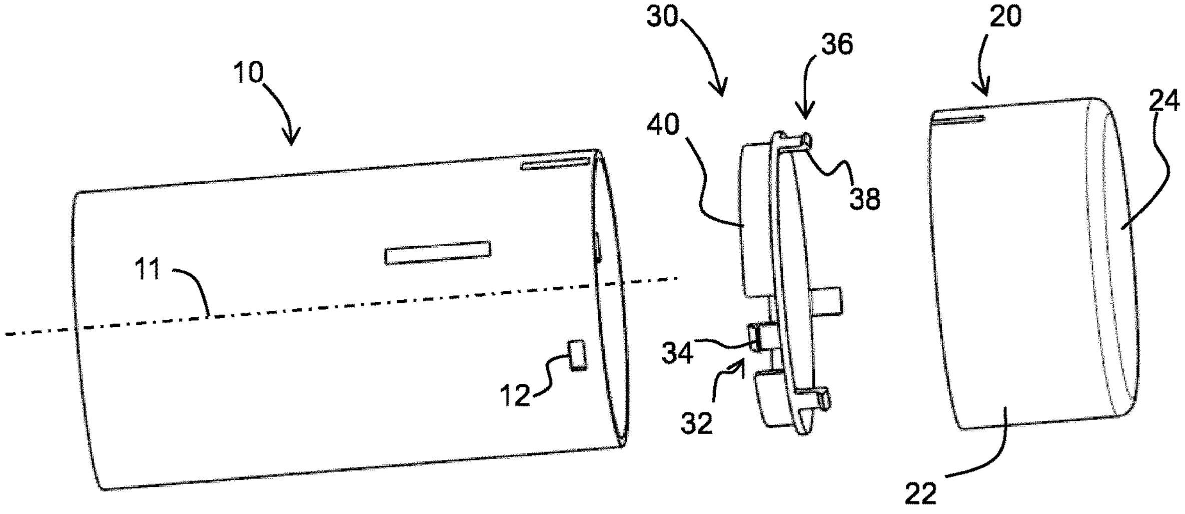
FIG. 1 shows a housing of a lighting device.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a housing of a lighting device which comprises a main body and an end cap, with an intermediate connecting member for connecting the end cap to the main body. The connecting member has first tabs for engaging the main body and second tabs for engaging the end cap. The end cap has a first, assembled, position and a second, disassembly, position, in which the end cap is pushed closer to the main body along an elongate direction of the main body. In the second position, the second tabs are deformed and released from their respective tab receiving channels so that the end cap can be slid off after a rotation to avoid the second tabs re-engaging.

FIG. 1 shows a housing of a lighting device comprising a tubular main body 10 and an end cap 20 for fitting to an end of the main body.

The main body 10 houses a light source and some lighting circuitry (not shown), such as an LED arrangement mounted on a PCB lighting board. The end cap may also house electrical circuitry such as the driver for the LED arrangement. The end cap 20 may also include an external electrical connector (not shown), for example in the case that the end cap is the end cap of a tubular LED (TLED) lamp.

The end cap comprises a ring portion 22 for surrounding the tubular main body and an end face 24.

A connecting member 30 connects the end cap 20 to the main body 10. The connecting member functions as an intermediate part between the main housing and the end cap. The connecting member 30 is a push fit to engage with the main body 10 and the end cap 20 is a push fit over the connecting member 30.

The connecting member 30 comprises a disc, with a periphery at which connecting parts are formed to enable the end cap to be connected to the main body. These connecting parts comprise a first set of projecting first tabs 32. They project in parallel with an elongate axis 11 of the main body 10 towards the main body. There may be only a single first tab 32, but there are preferably two first tabs to form a stable coupling between the connecting member 30 and the main body, even though it will be glued as explained below.

Each first tab 32 has an attachment portion 34 forming a head of the tab. This attachment portion is a hook or barb. It is for fitting to a respective tab receiving portion 12 of the main body. The tab receiving portion 12 is for example an opening through the outer wall of the main body.

The tab receiving portion may instead be an internal structure which does not extend fully though the outer wall.

The connecting parts of the connecting member 30 also comprise a second set of projecting second tabs 36 each projecting towards the end cap 20. Each second tab has an attachment portion 38, which is again a hook or barb. It fits into a respective tab receiving channel of the end cap. In the example shown, this is an internal part of the end cap around the inside of the ring portion 22 so cannot be seen from the external view.

The tab receiving portions 12 and the tab receiving channels are discrete units so that the attachment portions have a particular angular orientation at which they engage with their respective receiving portions or receiving channels. For this purpose, a width of each receiving portion or channel in a circumferential direction is only slightly larger than the attachment portion.

The connecting member 30 comprises wall portions 40 between the first tabs 32 so that a substantially complete annular wall is formed (with slots where the first tabs are located). This annular wall provides a surface for supporting a glue ring, for example a silicon glue ring which functions both as a bond and a seal.

Figure 2:
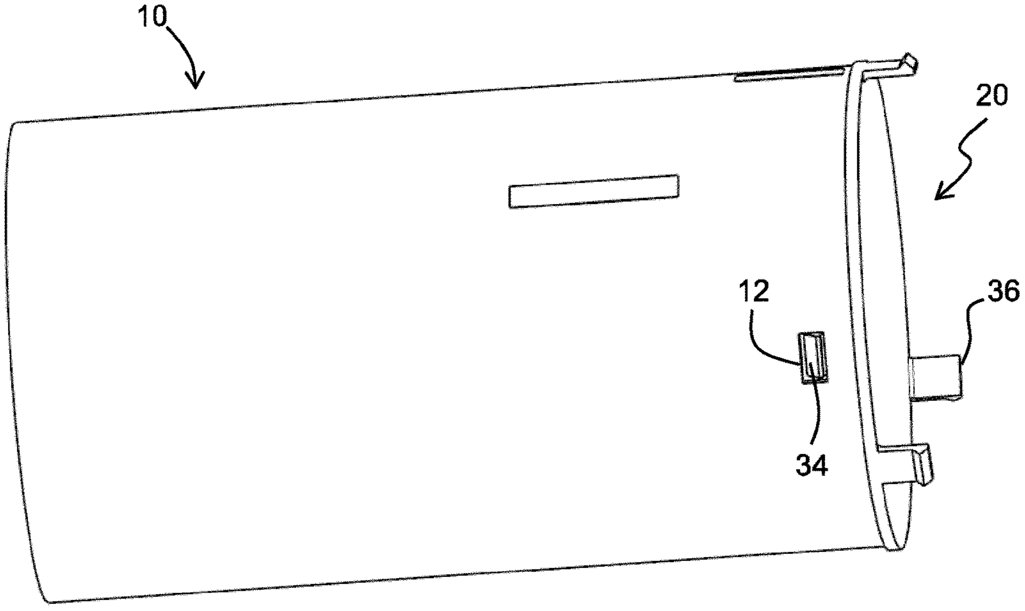
FIG. 2 shows how the connecting member is first fitted to the main tubular housing to form a sub-assembly.

To assemble the housing, the connecting member 30 is first fitted to the main tubular housing 10 to form the sub-assembly shown in FIG. 2. The hooks or barbs (i.e. the attachment portions 34) of the first tabs are clipped into the openings which define the receiving portions 12 of the main tubular housing.

The connecting member 30 is for example glued to the main body 10 with glue around an outer face of the periphery in particular around the annular wall. A glue area is also provided over the openings which define the tab receiving portions 12. Thus, the connecting member is sealed to the end of the main housing.

The end cap is then fitted as a push fit over the sub-assembly of FIG. 2.

Figure 3:
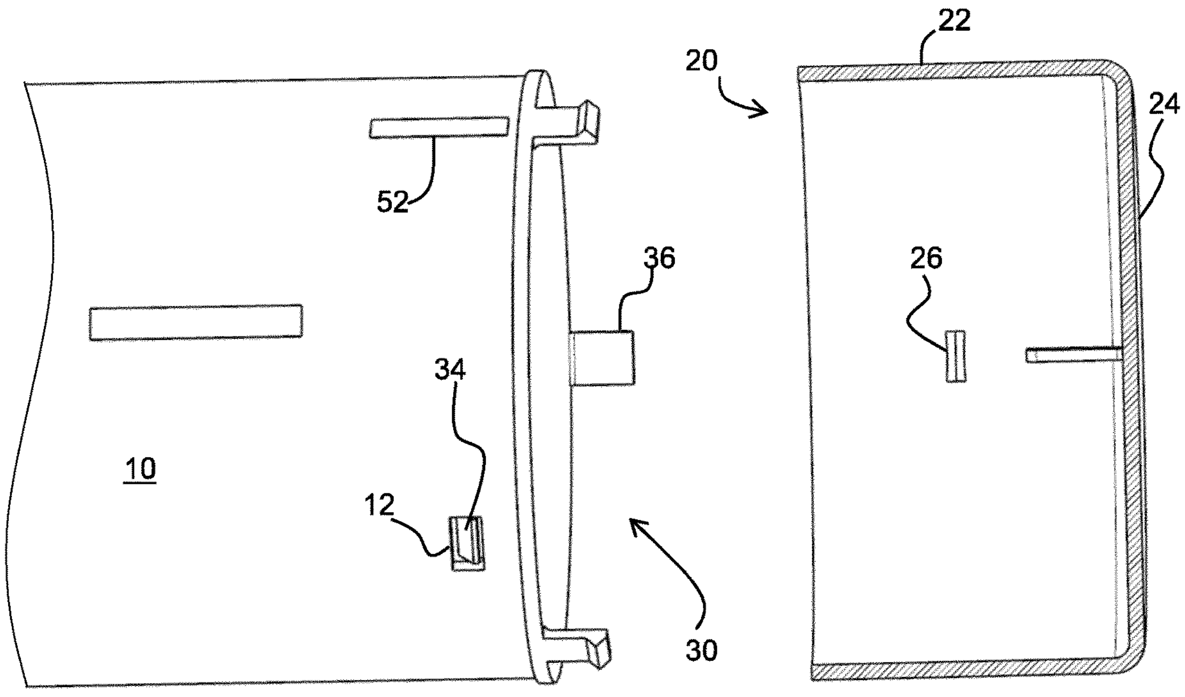
FIG. 3 shows the end cap next to the sub-assembly of FIG. 2.

FIG. 3 shows the end cap next to the sub-assembly of FIG. 2. The end cap is shown in cross section so the tab receiving channel 26 can be seen. It has limited circumferential width as explained above so that the second tabs align with the receiving channels on in one angular orientation of the end cap, or one of a set of possible angular orientations of the end cap.

Figure 4:
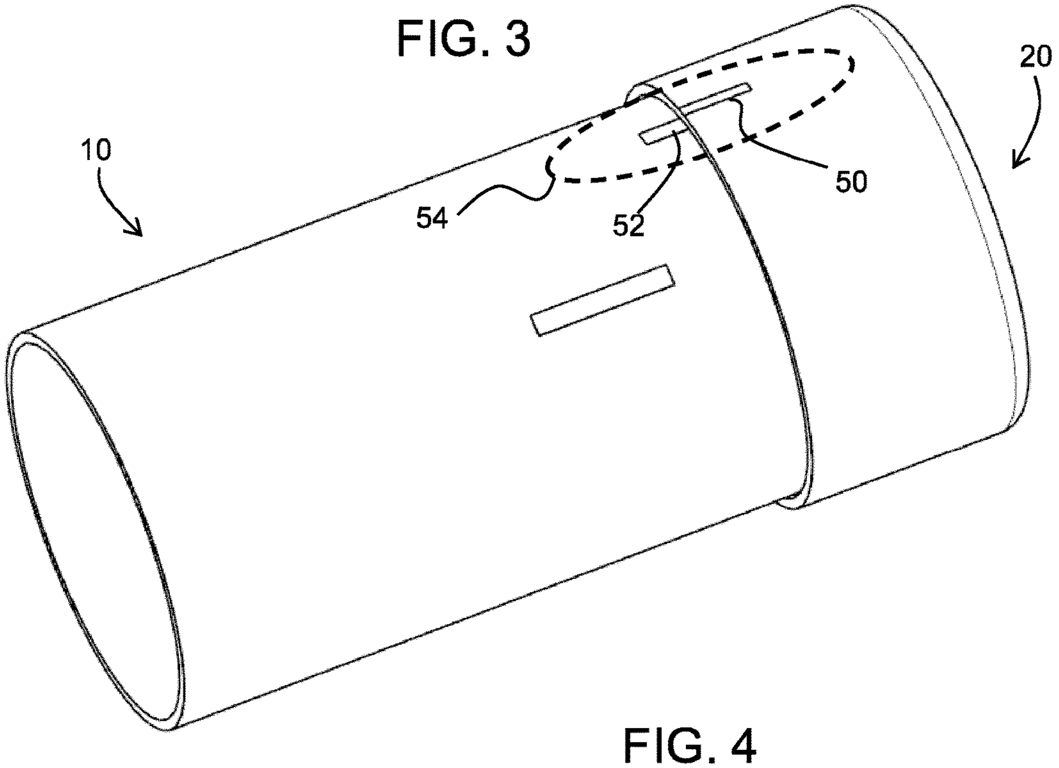
FIG. 4 shows a first alignment between the end cap and the main body in an assembled position.

To assist an installer in mounting the end cap with the correct angular orientation, a first alignment mark 50 is provided on the end cap and a second alignment mark 52 is provided on the main body. When the first and second marks are aligned as shown in FIG. 4 in region 54, the second tabs 32 are aligned with the tab receiving channels 26 so that the end cap can be clipped to the connecting member 30.

The end cap has a first, assembled, position, in which the second tabs 32 are fitted into their respective tab receiving channels 26.

Figure 5:
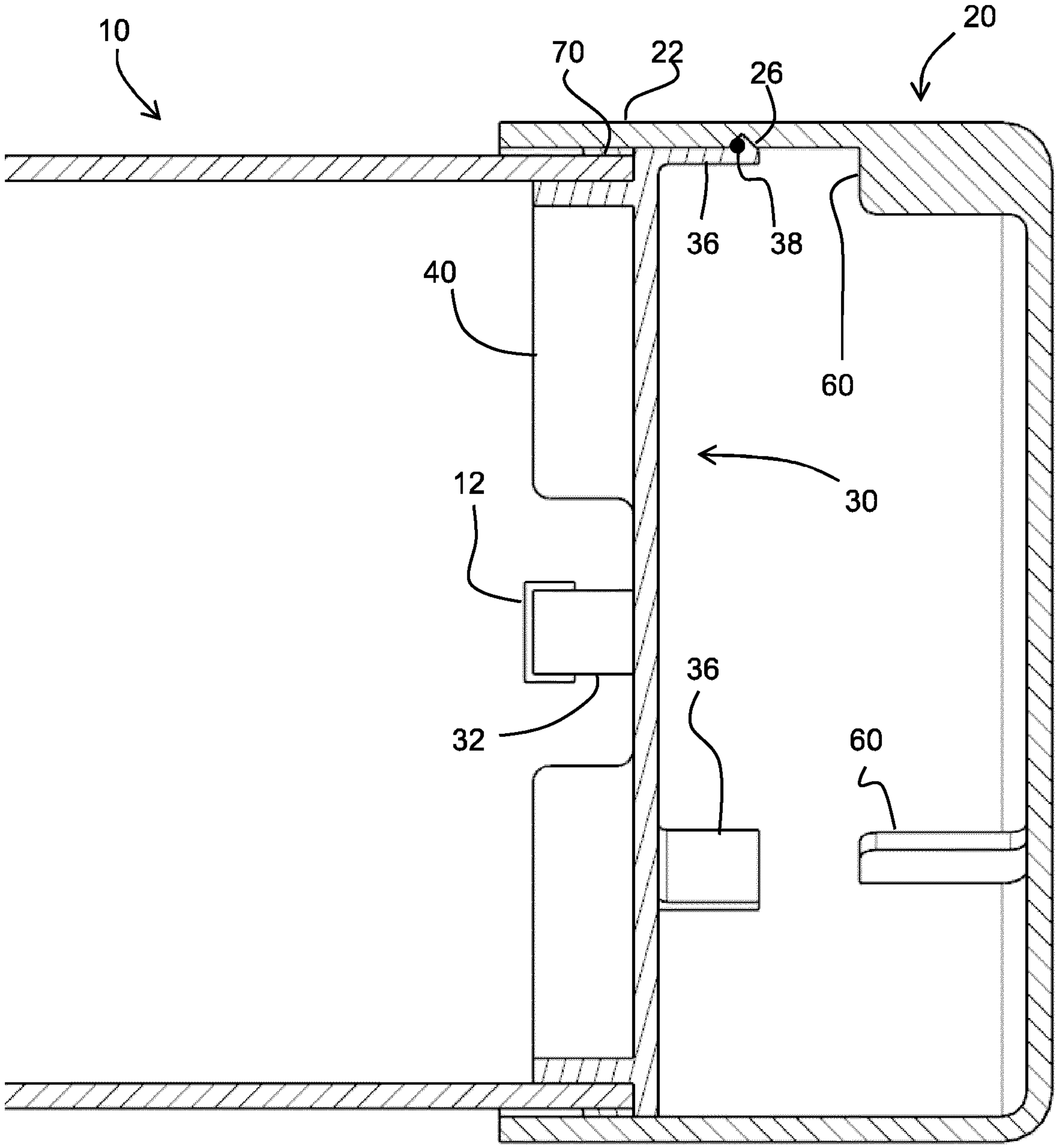
FIG. 5 shows a cross section of the coupling between the end cap and the main tubular body when in this assembled position.

FIG. 5 shows a cross section of the coupling between the end cap and the main tubular body when in this first, assembled, position.

The end cap also has a second, disassembly, position, in which the end cap is positioned closer to the main body along the elongate direction of the main body.

Figure 6:
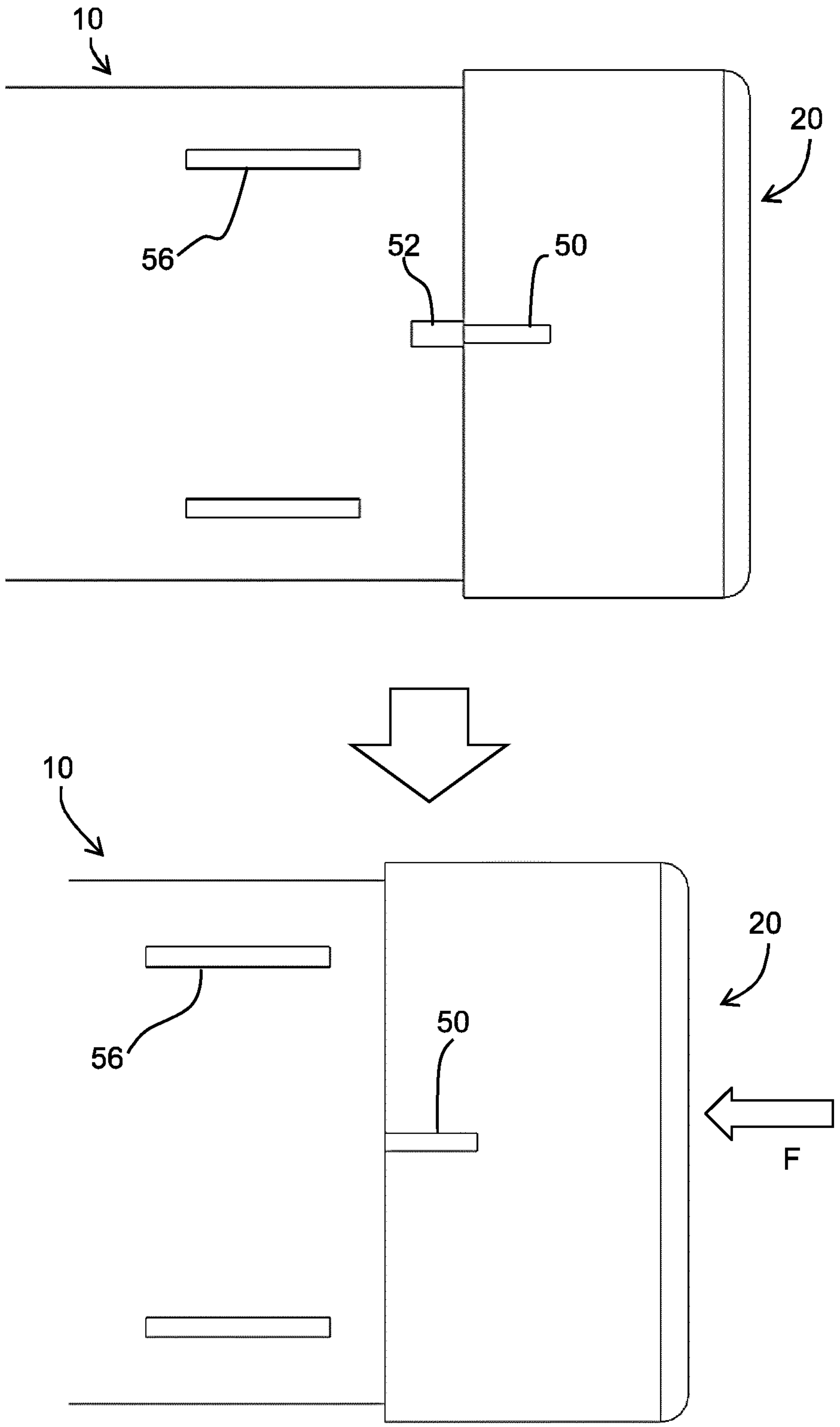
FIG. 6 shows the end cap being moved from the first position to a second position by a pushing force.

FIG. 6 shows the end cap being moved from the first position to the second position by a pushing force F. In the example shown, the end cap now covers up the second alignment marks 52.

Returning to FIG. 5, the end cap has a set of stops 60, with each stop aligned with a tab receiving channel, so that when the end cap is pushed towards the main body, the stops abut the second tabs with the second tabs released from their respective tab receiving channels.

Figure 7:
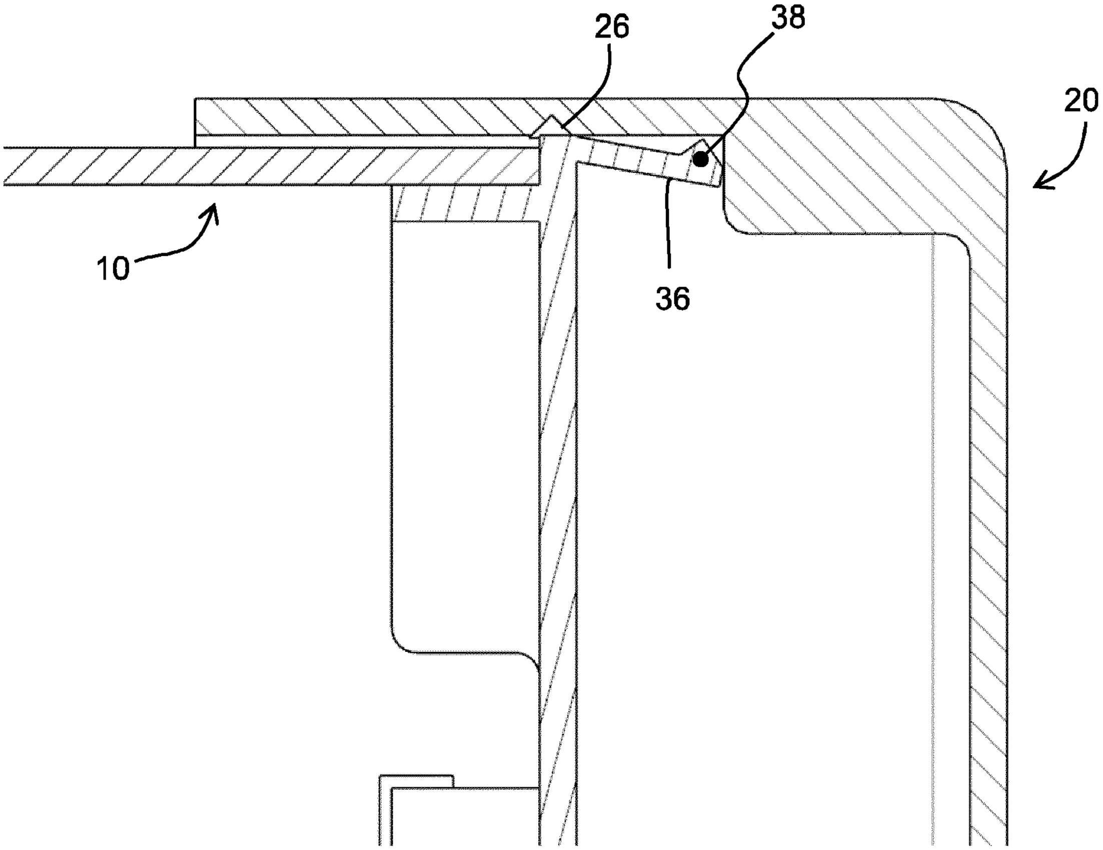
FIG. 7 shows a cross section of the coupling between the end cap and the main tubular body when in this second position.

FIG. 7 shows a cross section of the coupling between the end cap and the main tubular body when in this second, disassembly, position. The second tabs are deformed radially inwardly so that they are no longer engaged in the tab receiving channels 26.

The end cap may be glued over the main tubular body. This seals the internal volume of the end cap. FIG. 5 shows the glue 70 in an overlap area between the ring portion 22 of the end cap and the end of the main tubular body.

When the end cap is pushed to the second, disassembly, position as shown in FIG. 7, the glue connection 70 is released. Thus, the glue connection 70 provides a sufficiently rigid coupling for normal use as well a seal, but it can be broken to allow disassembly. The glue is for example a silicone glue.

Thus, pushing the end cap further over the main body than the normal assembled end cap position releases the second tabs from the channels and breaks the silicone glue bond. The end cap reaches an end position defined by the stops, with the second tabs released.

Figure 8:
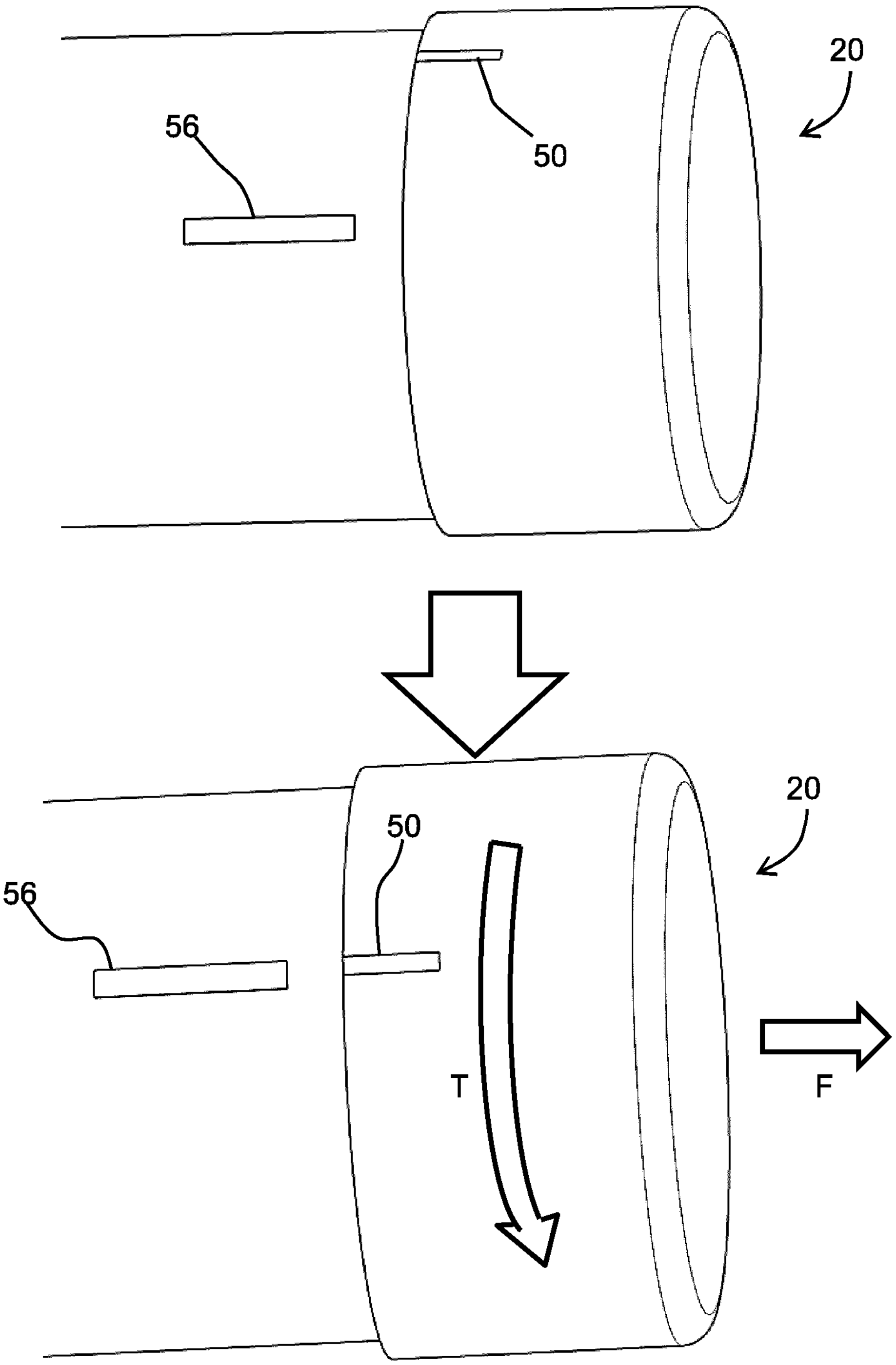
FIG. 8 shows a rotational adjustment and removal of the end cap.

To remove the end cap, the end cap is rotated so that the tab receiving channels are not aligned with the second tabs. FIG. 8 shows this rotational adjustment (using applied torque T) and a removal force F can then remove the end cap. The end cap is thus rotatable when in the second position to bring the second tabs (i.e. their attachment portions) out of alignment with their respective tab receiving channels. The rotation means that when the end cap is subsequently removed from the main housing, the second tabs (i.e. their attachment portions) no longer catch the channels, and the end cap can be slid off the end of the main body.

The end cap is in this way rotatable when in the second, disassembly, position to bring the second tabs (i.e. their attachment portions) out of alignment with their respective tab receiving channels.

FIG. 8 shows that a third alignment mark 56 is provided on the main body. The third mark 56 and first mark 50 are aligned when the second tabs are out of alignment with the tab receiving channels. The third mark 56 is thus used to guide a user to rotate the end cap to a suitable angular orientation so that the second tabs are free from the channels and the end cap can be slid off.

In this design, the three parts of the housing clip together. When the connecting member 30 is fitted to the main body 10, the first tabs are retained in tab receiving portions (e.g. openings in the outer wall of the main housing). The connecting member is thus first clipped to the main housing, so that a structure is formed with projecting second tabs. These second tabs are then caught in channels of the end cap 20 when the end cap is fitted over the assembly of the main body and the connecting member. This holds the cap in place.

The connecting member is for example attachable to the main housing by a push fit, the end cap is attachable to main housing to the first position by a push fit, and the end cap is movable from the first position to the second position by a push operation with no tools. The end cap can then be rotated and slid off by hand. Thus, the assembly and disassembly may be performed by hand with no special tools.

Figure 9:
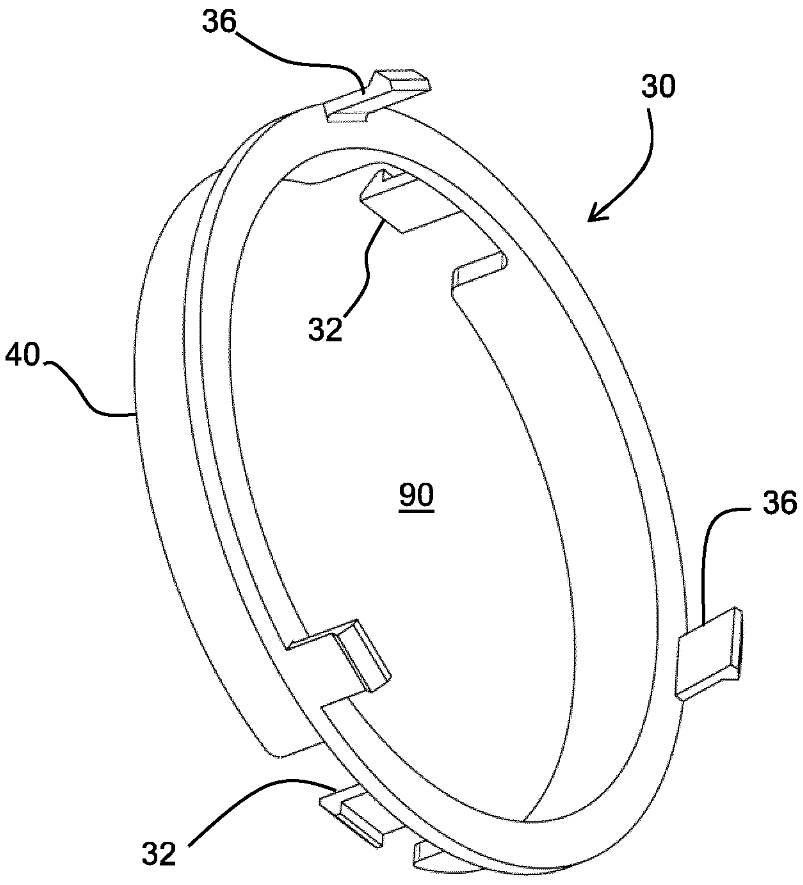
FIG. 9 shows another example of a connecting element to be used as part of the lighting device housing of FIG. 1.

The full disassembly provides access to the contents of the end cap 30 as well as the contents of the main body 10 of the housing. To provide access to the main body of the housing without removing the connecting member 30, a hole 90 can be formed in the connecting member 30 as shown in FIG. 9.

This hole 90 enables connection between the driver (in the end cap) and the LED board (in the main body of the housing) as well as providing access to the interior space of the main body of the housing once the end cap 20 is removed. The hole 90 also makes it easier for an operator to remove the glue, through the hole 90, so that the connecting member can be removed, or the operator can simply pull the connecting member off the main body of the housing (for example optionally pushing inwardly on the attachment portions 34 from outside the housing). The disassembly thus enables the contents of the main tubular body (such as a lighting board) and of the end cap (such as a driver circuit) to be removed.

This enables easy replacement of parts, or dismantling for recycling. The removable function of the end cap enables disassembly without special tools and enables many parts to be reused, saving cost and effort.

A lighting device using the housing for example has first and second end caps at an opposite end of the main body. They may both have the design as described above, or there may only be a removable end cap of the design described above at one end.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A housing of a lighting device comprising:

a tubular main body;

an end cap for fitting to an end of the main body, the end cap comprising a ring portion for surrounding the tubular main body and an end face; and a connecting member for connecting the end cap to the main body, wherein the main body comprises a set of tab receiving portions, wherein the end cap comprises a set of tab receiving channels at an internal face of the ring portion, and wherein the connecting member comprises a periphery having:

a first set of one or more projecting first tabs, each projecting towards the main body and each having an attachment portion for fitting to a respective tab receiving portion of the main body; and a second set of projecting second tabs each projecting towards the end cap and each having an attachment portion for fitting into a respective tab receiving channel of the end cap, wherein the tab receiving portions and the tab receiving channels are discrete units, wherein a width of each unit in a circumferential direction corresponds to a width in the circumferential direction of the corresponding attachment portion, wherein the end cap has a first, assembled, position, in which the second tabs are fitted into their respective tab receiving channels, and a second, disassembly, position, in which the end cap is positioned closer to the main body along an elongate direction of the main body, and the second tabs are deformed and released from their respective tab receiving channels, and wherein the end cap is rotatable when in the second position to bring the second tabs out of alignment with their respective tab receiving channels.

2. The housing of claim 1, wherein the end cap comprises a set of stops aligned with the tab receiving channels along the direction parallel to the elongate direction of the tubular main body, so that when the end cap is pushed towards the main body, the stops abut the second tabs with the second tabs released from their respective tab receiving channels.

3. The housing of claim 1, wherein the connecting member comprises a disc, for example with an opening, and the periphery is an outer region of the disc.

4. The housing of claim 1 wherein the first set comprises two or more first tabs.

5. The housing of claim 4, wherein the connecting member further comprises wall portions between the first tabs.

6. The housing of claim 1, wherein the connecting member is glued to the main body with glue around an outer face of the periphery.

7. The housing of claim 1, wherein the end cap is glued to the main body with glue between an overlap area between the ring portion of the end cap and the end of the main body.

8. The housing of claim 7 wherein the glue connection between the end cap and the main body is adapted to be released when the end cap is pushed from the first position to the second position.

9. The housing of claim 1, wherein the housing is waterproof.

10. The housing of claim 1, wherein the connecting member is attachable to the main housing by a push fit, the end cap is attachable to main housing to the first position by a push fit, and the end cap is movable from the first position to the second position by a push operation with no tools.

11. A lighting device comprising:

the housing of claim 1;

a second end cap at an opposite end of the main body to the end cap; and a lighting circuit disposed within the main body.

12. The lighting device of claim 11, comprising a tubular LED lamp.

13. A housing of a lighting device comprising:

a tubular main body;

an end cap for fitting to an end of the main body, the end cap comprising a ring portion for surrounding the tubular main body and an end face; and a connecting member for connecting the end cap to the main body, wherein the main body comprises a set of tab receiving portions, wherein the end cap comprises a set of tab receiving channels at an internal face of the ring portion, and wherein the connecting member comprises a periphery having:

a first set of one or more projecting first tabs, each projecting towards the main body and each having an attachment portion for fitting to a respective tab receiving portion of the main body; and a second set of projecting second tabs each projecting towards the end cap and each having an attachment portion for fitting into a respective tab receiving channel of the end cap, wherein the tab receiving portions and the tab receiving channels are discrete units, wherein a width of each unit in a circumferential direction corresponds to a width in the circumferential direction of the corresponding attachment portion, and wherein the end cap has a first, assembled, position, in which the second tabs are fitted into their respective tab receiving channels, and a second, disassembly, position, in which the end cap is positioned closer to the main body along an elongate direction of the main body, the second tabs are deformed and released from their respective tab receiving channels, and a set of alignment marks comprising a first mark on the end cap and a second mark on the main body, a third mark on the main body, wherein the first and second marks are aligned when the second tabs are aligned with the tab receiving channels and wherein the third and first marks are aligned when the second tabs are out of alignment with the tab receiving channels.

* * * * *